Patented June 13, 1950

2,511,551

UNITED STATES PATENT OFFICE 2,511,551

ALUMINUM ALLOYS

Loren W. Smith, Kenmore, and Vernon J. Pingel, Buffalo, N. Y., assignors, by mesne assignments, to Cornell Aeronautical Laboratory, Inc., Buffalo, N. Y., a corporation of New York No Drawing. Application June 19, 1947, Serial No. 755,715

3 Claims. (Cl. 75—146)

The development of high strength aluminum alloys for aircraft work and other uses where special composition and treatment were essential has required a corresponding development of special welding techniques in order to make the joint strength accord with the improved material. Such high strength aluminum alloys as 24S-T and 75S-T for example, and other light metals which have been extensively developed in the aircraft industry, have stimulated research in various alloys for welding rods in the endeavor to find compositions most suitable for use with them.

The present invention is directed to the composition of an alloy for that purpose. When made into welding rods and applied in the usual manner, the welded joint has shown a high strength efficiency for both 24S-T and 75S-T aluminum alloys after welding and heat treatment. This alloy is also very good for high strength castings.

A further object of the invention is to provide good corrosion resistance characteristics in order to insure that the permanent strength of the weld will be maintained under service conditions. The composition herein disclosed has been subjected to corrosion as well as strength tests with satisfactory results. It also has good handling properties in the welding operations. It is applicable to any sort of aluminum welding, whether in the sheet, bar, tubular or other structural forms.

While this welding rod alloy is of somewhat complicated composition, the element of cost is a relatively minor matter in such work, where superior quality is of the utmost importance. For highly stressed aluminum alloy materials the extra care in the composition of the welding rods will generally be justified by the results in service.

The improvement in welding rods comprising the present invention consists essentially in an aluminum base alloy to which has been added other elements to produce optimum joint strength. These other elements are zinc, chromium, silicon, magnesium, and titanium, with the balance being aluminum having the usual commercial impurities of silicon and iron. Such slight impurities do not appreciably affect the result. The special ingredients which are added to the aluminum to produce the alloy may vary in amount over a moderate range as indicated in the "Percent range" column of the following table. Within this range of constituent composition the properties of the welding rod will not vary seriously. A preferred composition lying within that range is indicated in the second column of percentages.

Composition

|  | Percent Range | Preferred Composition |
| --- | --- | --- |
|  |  | Per cent |
| Zinc | 3.0 to 6.0 | 5.0 |
| Chromium | 0.4 to 1.0 | 0.5 |
| Silicon | 6.0 to 16.0 | 14.0 |
| Magnesium | 0.2 to 2.0 | 0.5 |
| Titanium | 0.1 to 0.5 | 0.3 |
| Balance Aluminum with commercial impurities of silicon and iron. | | |

The same formula may be used in high strength castings.

It will be understood that the preferred composition may be varied in any element within the range specified in the range column without departing from the scope of the invention as stated in the following claims.

We claim:

1. An aluminum alloy consisting of the following composition, zinc 3.0 to 6.0 percent, chromium 0.4 to 1.0 percent, silicon 6.0 to 16.0 percent, magnesium 0.2 to 2.0 percent, titanium 0.1 to 0.5 percent, balance aluminum.

2. An aluminum alloy consisting of the following composition, zinc 5.0 percent, chromium 0.5 percent, silicon 14.0 percent, magnesium 0.5 percent, titanium 0.3 percent, balance aluminum.

3. An aluminum alloy consisting of the following ingredients in substantially the amounts stated, zinc 5.0 percent, chromium 0.5 percent, silicon 14.0 percent, magnesium 0.5 percent, titanium 0.3 percent, balance aluminum.

LOREN W. SMITH.
VERNON J. PINGEL.

REFERENCES CITED

The following references are of record in the file of this patent:

UNITED STATES PATENTS

| Number | Name | Date |
| --- | --- | --- |
| 1,934,281 | Stay | Nov. 7, 1933 |
| 2,075,090 | Bonsack et al. | Mar. 30, 1937 |
| 2,146,330 | Comstock | Feb. 7, 1939 |
| 2,280,176 | Stroup | Apr. 21, 1942 |